United States Patent
Pornel

(10) Patent No.: US 6,891,779 B1
(45) Date of Patent: May 10, 2005

(54) PORTABLE ELECTRONIC RECORDER AND METHOD FOR OPERATING SAME

(75) Inventor: Bruno Pornel, Brussels (BE)

(73) Assignee: Symfo S.A. (BE)

( * ) Notice: Subject to any disclaimer, the term of this patent is extended or adjusted under 35 U.S.C. 154(b) by 0 days.

(21) Appl. No.: 09/743,828

(22) PCT Filed: Jul. 17, 1998

(86) PCT No.: PCT/BE98/00112

§ 371 (c)(1), (2), (4) Date: Mar. 5, 2001

(87) PCT Pub. No.: WO00/04509

PCT Pub. Date: Jan. 27, 2000

(51) Int. Cl.$^7$ .............................................. G04F 10/00
(52) U.S. Cl. ......................... 368/113; 368/10; 368/249
(58) Field of Search ........................ 368/10, 63, 185, 368/374, 108, 243, 249–251

(56) References Cited

U.S. PATENT DOCUMENTS

| | | | | |
|---|---|---|---|---|
| 4,005,571 A | * | 2/1977 | Wolff | 368/108 |
| 4,660,991 A | * | 4/1987 | Simon | 368/10 |
| 4,853,854 A | | 8/1989 | Behar et al. | 364/413.01 |
| 4,894,728 A | | 1/1990 | Goodman | 360/6 |
| 5,157,640 A | | 10/1992 | Backner | 368/10 |
| 5,444,673 A | * | 8/1995 | Mathurin | 368/63 |
| 5,495,961 A | | 3/1996 | Maestre | 221/3 |
| 5,554,967 A | | 9/1996 | Cook et al. | 340/309.15 |
| 5,558,638 A | | 9/1996 | Evers et al. | 604/66 |
| 5,612,869 A | | 3/1997 | Letzt et al. | 395/203 |
| 5,623,242 A | | 4/1997 | Dawson, Jr. et al. | 340/311.1 |
| 5,691,932 A | | 11/1997 | Reiner et al. | 368/10 |
| 5,706,257 A | | 1/1998 | Rothman et al. | 368/10 |
| 5,881,025 A | * | 3/1999 | Murakami | 368/185 |
| 6,075,755 A | * | 6/2000 | Zarchan | 368/10 |

FOREIGN PATENT DOCUMENTS

| | | |
|---|---|---|
| DE | 44 43 850 A1 | 7/1995 |
| DE | 196 37 383 A1 | 4/1998 |
| WO | WO 96/41242 | 12/1996 |
| WO | WO 97/00502 | 1/1997 |
| WO | WO 97/08605 | 3/1997 |

* cited by examiner

*Primary Examiner*—Kamand Cuneo
*Assistant Examiner*—Jeanne-Marguerite Goodwin
(74) *Attorney, Agent, or Firm*—Olson & Hierl, Ltd.

(57) ABSTRACT

The invention relates to a device for recording events (1) comprising means (3, 4, 6, 7, 8, 5) for giving commands to the said device (1), means for emitting signals (9) and a memory for storing the commands given to the said device (1). The means (3, 4, 6, 7, 8, 5) for giving commands comprise a first means (3) for giving a command for recording the start of an event and a second means (4) for giving a command for recording the end of an event. The device (1) also comprises means for triggering a signal as a reminder that an event is in progress, the said signal being activated by the said first means (3) and deactivated by the said second means (4). The device moreover comprises means for storing the date and time of the start and end of the event in the memory.

18 Claims, 2 Drawing Sheets

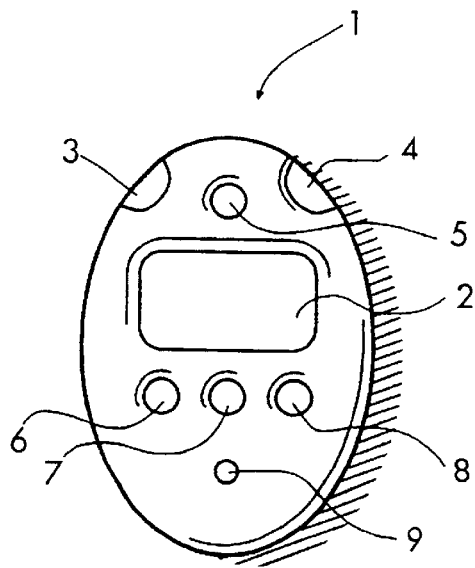
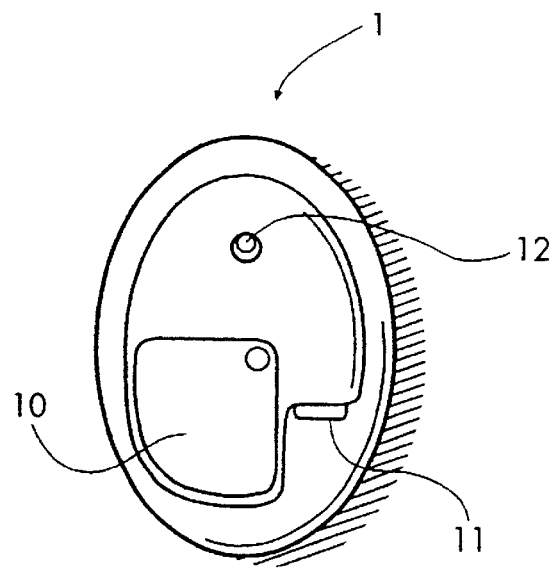
Fig. 1 Fig. 2
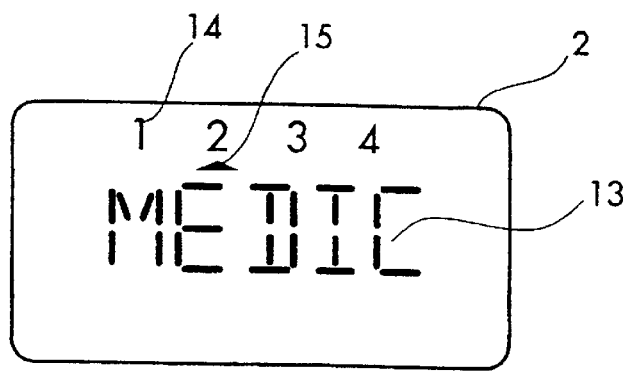
Fig. 3
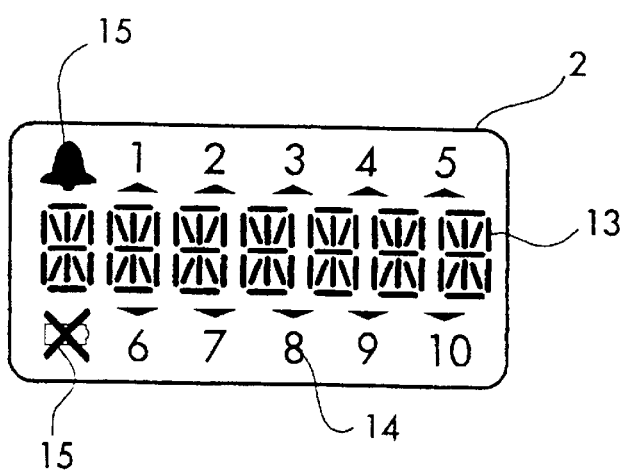
Fig. 4

PORTABLE ELECTRONIC RECORDER AND METHOD FOR OPERATING SAME

TECHNICAL FIELD

The present invention relates to the recording of data on the characteristics of events, in particular during the conducting of clinical trials of medicaments or analysis of human behavior.

PRIOR ART AND CRITICISM OF THIS PRIOR ART

The collecting of data relating to the conduct of clinical trials of medicaments or analysis of human behaviour is a familiar problem in the pharmaceutical industry and in any institution charged with the analysis of human behaviour. In the method which is traditionally used, a clinical research center or an institution charged with the analysis of human behaviour defines the trials which are to be conducted and collects and analyses the results. To this end, it distributes standardized information on the time intervals to be complied with when administering medicaments and on the symptoms or events whose start, end and, if appropriate, intensity, are to be recorded. These data are transmitted to local centers, then to doctors or associates, who communicate them to the patients who have been selected for the clinical trials or for analysis of human behaviour. The patients are instructed to comply with the dosage regimen of one or more medicaments and to record the start and end of the occurrence of a set of predetermined symptoms, or particular events, for periods which may be up to several months. This procedure for recording data is carried out using a range of documents such as notebooks and forms, completed and validated by the patients concerned, verified by the doctors, verified again by the local centers, then sent to the clinical research center. These centers are then able to carry out the statistical analyses required.

Such a procedure has many disadvantages. One major disadvantage is the lack of reliability of the recording of the data done by the patient. Incomplete data must, if possible, be completed by the doctor, the associate or the local center, or else rejected. The patient should have his notebook or record form permanently on his person, so as to be able to make a note of the events immediately as they occur. However, there is nothing to compel him to do so, and he may restrict himself to noting down a set of events a posteriori. It will be readily appreciated that such a manner of proceeding greatly increases the risk of omission and inaccuracy. Moreover, when these data are processed, it is not possible to tell whether they have been recorded immediately or a posteriori. It is not therefore possible to judge the quality of the data which have been collected.

Another disadvantage of the method according to the prior art is the lack of confidentiality. The data recorded in writing can be seen by unauthorized persons.

Finally, this method requires data coding. This coding is costly, increases the time needed for collecting data, almost always requires corrections and is an additional source of errors and omissions.

There are many types of devices which help the patient comply with a dosage regimen. For example, U.S. Pat. No. 5,706,257 discloses a device which produces an audio signal when the planned time for taking a medicine arrives. A button then allows the user to indicate that he has taken the dose of medicament, thus stopping the audio signal. The document U.S. Pat. No. 5,554,967 describes a similar appliance, with the format of a credit card. The document U.S. Pat. No. 5,623,242 describes an appliance capable of receiving instructions on administration of a medicament via a radio link of the "pager" type. These appliances are portable. Some of them, such as the one described in U.S. Pat. No. 5,495,961, permit downloading of reference data from a computer. They can be of considerable service in helping the patient to comply with a prescribed dosage regimen. However, none of them permits the collection of data concerning the symptoms observed, or the downloading of these data to a computer.

The document U.S. Pat. No. 5,691,932 describes a data collection and reminder system for monitoring of neonates. The device permits the collection of data concerning specific events such as food intake, growth and learning. It permits the downloading, from a computer, of data such as the intervals for administration of medicaments and the reminders. It also permits the recorded data to be downloaded to a computer with a view to processing these data. However, this device is designed for a specific use in paediatrics. It does not permit the programming of variable and general campaigns for clinical trials or analysis of human behavior. It does not comprise means ensuring the reliability of the data recorded. The document DE 4443850 discloses a device for recording activities or data relating to projects. This device does not, however, comprises means for indicating to the user that an action has to be undertaken.

AIM OF THE INVENTION

The aim of the present invention is to make available a device and a method for recording the characteristics of events, and which make it possible to obtain more reliable and more complete data than the data obtained with the traditionally used method.

DESCRIPTION

The subject of the invention is a device for recording events, comprising means for giving commands to the said device, means for emitting signals and a memory for storing the commands given to the said device. The means for giving commands to the said device comprise a first means for giving a command for recording the start of an event and a second means for giving a command for recording the end of an event. The device comprises means for triggering a signal as a reminder that an event is in progress, the said signal being activated by the said first means and deactivated by the said second means. The device moreover comprises means for storing the date and time of the start and end of the event in the memory.

The device can also comprise a means for giving commands for recording the occurrence of an isolated event and means for storing the date and time of this event in the memory.

It comprises means for commanding the selection of a type of event from a set of types of events, means for triggering a signal as a reminder that a selection is to be made, the said signal being able to be activated by the second means for giving a command for recording the end of an event or by the means for giving commands for recording the occurrence of an isolated event, and means for storing the selected type of event in the memory.

It comprises means for commanding the selection of the value of a characteristic of an event from a set of values of characteristics, means for triggering a signal as a reminder that a selection is to be made, the said signal being able to be activated by the second means for giving a command for recording the end of an event or by the means for giving commands for recording the occurrence of an isolated event, or by the means for commanding the selection of a type of event, and means for storing the value of the characteristic of the event.

It comprises means for reminding the user that an action is to be taken.

It comprises means for downloading, into its memory, data originating from a computer and defining the campaign of trials to be conducted, and for downloading the results of these trials, recorded in its memory, to the said computer.

The means for giving commands to the said device can comprise push-buttons. The latter can comprise means ensuring that commands are given to the said device only following a number of (for example two) presses in quick succession, in order to avoid accidental recording.

The means for giving commands to the said device can also comprise voice recognition means.

The means for emitting signals can comprise means for emitting tones, light signals, or voice synthesis means.

The means for commanding the selection of a type of event or of the value of a characteristic of an event can comprise a display screen or voice synthesis means.

The subject of the invention is also a method for collecting data in a campaign of clinical trials or analysis of human behaviour, wherein first data define a set of types of events to be recorded, a set of the possible values of one or more characteristics associated with each of these types of events, and a set of particular actions to be taken at specified moments, said first set of data having been set up by a clinical research center or center for analysis of human behavior, characterized in that it comprises the following steps:

transfer of these first data, through local centers, to the computers of doctors or of associates;

downloading these first data to devices according to any of the claims;

recording of second data consisting of the dates and times of the start and end or occurrence of the events observed, with their types and the value of their characteristics;

downloading the said recorded second data to the computers of the doctors or associates;

transfer of these recorded second data, through local centers, to the clinical research centre or center for analysis of human behavior;

exploitation of these second data by the clinical research centre or the center for analysis of human behaviour.

DESCRIPTION OF THE FIGURES

Other characteristics and advantages of the invention will become evident from reading the following description, in which reference is made to the appended figures.

FIG. 1 is a front view of a device for recording events, according to one embodiment of the invention.

FIG. 2 is a rear view of such a device.

FIG. 3 shows a display example.

FIG. 4 shows a set of graphic elements which may appear on a screen of such a device.

DETAILED DESCRIPTION OF EMBODIMENTS

Figure 5:
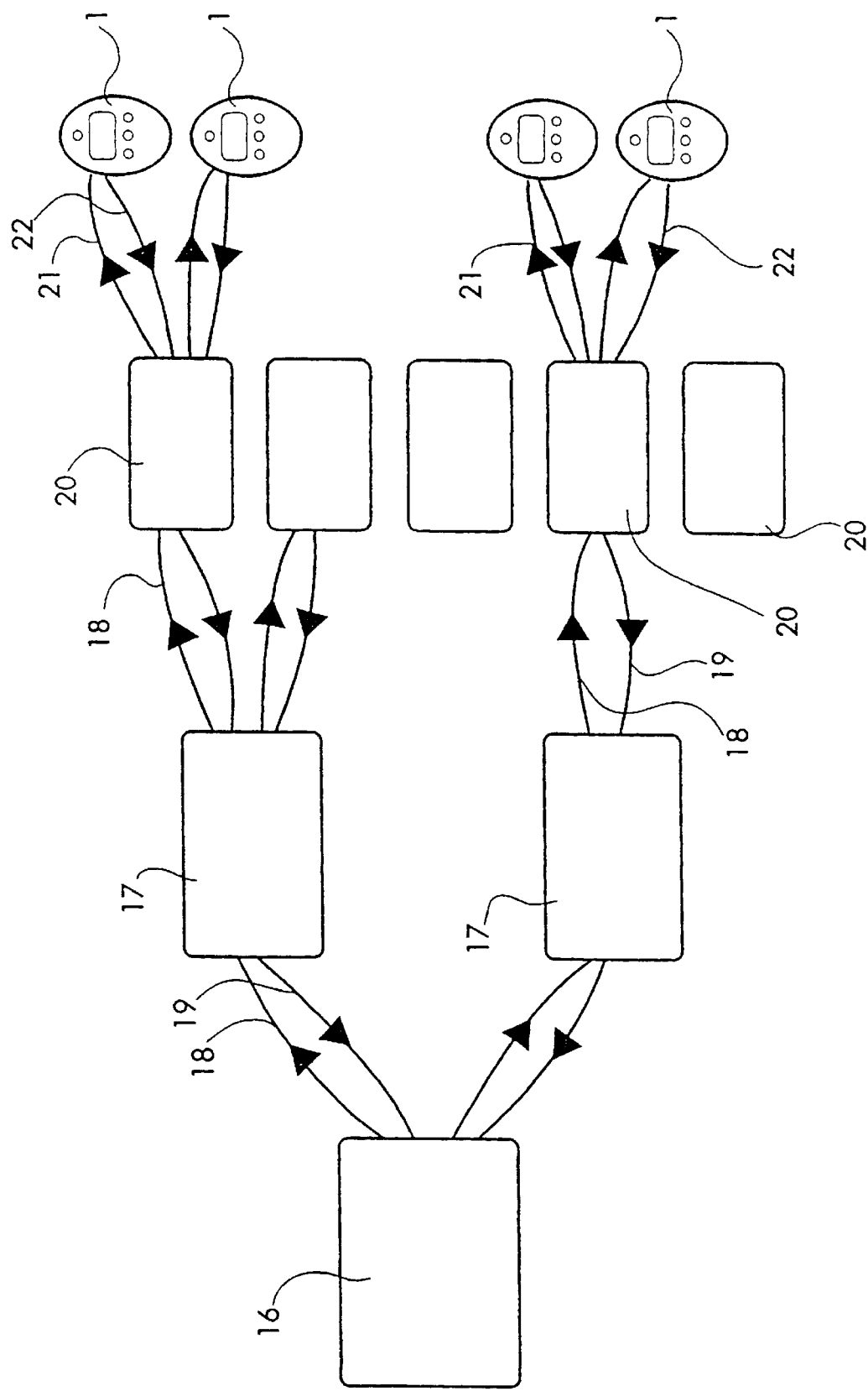
FIG. 5 is a diagrammatic representation of a method according to the invention for conducting clinical trials.

FIG. 1 shows a device 1 for recording events, according to one embodiment of the invention. This device comprises a display screen 2 which can display a set of alphanumerical characters or icons. This display screen 2 can be of the LCD (Liquid Crystal Display) type, for example, and can have lighting means. The device 1 comprises main buttons in the upper left 3 and upper right 4, with which it is possible to give the commands for recording the start and end, respectively, of an event. A secondary button in the upper centre 5 can be used to give the command for recording the occurrence of an isolated event. Secondary buttons on the left 6 and right 8 can be used to select an element from a list displayed on the screen 2, and the secondary button in the lower centre 7 can be used to validate the selection that has been made. An audio signal generator 9, such as a buzzer, can emit one or more types of tone.

FIG. 2 is a rear view of the device 1. A flap 10 permits access to a battery. A socket 11 permits the insertion of a connector establishing serial connection to a computer. An attachment point 12 allows a removable clip or a cord to be fixed to the device 1, thus allowing the device to be clipped onto one's belt or worn round the neck. The shape and the dimensions of the device 1 are such that it can easily be carried around at all times, and under any circumstances, without getting in the way. The user can therefore have the said device 1 permanently within reach. This greatly increases the reliability of the data recorded using the device 1.

FIG. 3 shows a display example. In this example, an alphanumeric message 13 shows the user that he must take a medicament, and indicates, with an arrow 15, from a list 14, which of the medicaments is to be taken. The messages displayed can be adapted to the language spoken by the user.

FIG. 4 shows the set of elements which can be displayed on the screen 2. It is of course also possible, without departing from the scope of the invention, to produce other sets of display elements. For example, it will be possible to use a screen that is displayed point by point.

Like devices known from the prior art and cited hereinabove, the device 1 comprises an audio and/or visual reminder function reminding the user that an action, such as taking a medicament, must be carried out. This reminder includes the indication of the action which is to be carried out, for example 'MEDIC', and the nature or dose of the medicament to be taken.

The use of the device 1 involves a set of procedures by which the recording of data is rendered more reliable.

In order to avoid accidental recording of events, for example when the device 1 is located in the user's pocket, pressing on a button, which initiates recording, must be done twice in quick succession, for example in less than a second, in order to be accepted. In addition, an acknowledge tone, specific to the procedure in progress, informs the user that his command has indeed been executed.

A procedure described below permits recording of a prolonged event, such as a symptom (examples: headaches, cramps, hot flushes). When such an event occurs, the user presses twice, in quick succession, on the main button in the upper left 3. The device 1 emits a single tone, stores the start date and time, and displays alternately on the screen 2 a message such as 'EVENT' or 'SYMPTOM' and the time. The list of possible events is displayed above and below this message. When this event disappears, the user presses twice, in quick succession, on the main button in the upper right 4. The device 1 then stores the end date and time and enters the procedure for selection of the type of event and its characteristic or characteristics, as described below. Between the recording of the start and the end of the event, a signal periodically reminds the user that the recording of an event is in progress. If, after a definable time period, for example three hours, the end of the event has not been recorded, the device closes the event automatically and stores the fact that this end has not been validated.

A procedure similar to that described above permits the recording of isolated events, such as taking a medicament, getting up, going to bed or giving a blood sample. When such an event takes place, the user presses twice, in quick succession, on the secondary button in the upper center 5. The device 1 emits a single tone, stores the date and time of the event and enters the procedure for selection of the type of event and of its characteristic or characteristics, as described blow.

The procedures for selection of the type of event and of its characteristic or characteristics, as described below, apply both to prolonged events and to isolated events. When a prolonged or isolated event has been recorded, the user selects from the displayed list, using the secondary buttons on the left 6 and right 8, the appropriate type of event, then validates his choice by pressing twice, in quick succession, on the secondary button in the lower center 7. He then does the same for the characteristic or characteristics (example: slight, mild, strong) of the event in question. The screen 2 then alternately displays a message such as 'VALID' and a message such as 'YES+arrow downwards/NO arrow upwards'. The user then presses twice, in quick succession, on the secondary button in the lower center 7 in order to validate his choice, and on the upper secondary button 5 in order to invalidate his choice. In the case where the user validates his choice, the data are stored. In the case where the user invalidates his choice, a second confirmation is requested from him and the data are not recorded. Until a validation has been made, a periodic reminder signal is emitted by the device 1. Scrolling through the numerical list of elements to be selected, the screen can display, in the language of the user, the abbreviated name of the symptom or of the characteristic.

Some clinical trial campaigns may involve only a single type of prolonged event or a single type of isolated event. Some events may not require the recording of a characteristic. In these cases, the above procedures for selection of the type of event and its characteristic or characteristics will not be activated. Only the final validation will be made.

In order to ensure that the device 1 is indeed being kept within reach by the user, a validation procedure is provided for checking that the device 1 is being carried/worn. In the example described, this validation is made pressing twice, in quick succession, on the secondary buttons 6, 7 and 8 and is followed by a double acknowledge tone. Such a validation can be made by the user, at his own initiative, or can be requested, by means of a reminder, by the device, at predetermined or random moments.

The volume of the tones emitted by the device 1 can be selected by the user.

A visual or audio indication shows the user, in good time, for example 15 days, that the battery of the device 1 must be replaced.

FIG. 5 is a diagrammatic representation of the steps in a method for conducting campaigns of trials such as clinical trials or analysis of human behavior. The setting-up of the program of trials by a research center 16 can include definition of the list of the types of events to be recorded, the list of the characteristics of each of these types of events and of their possible values. This program is then sent 18 to local centers 17, then to the computers 20 of doctors or associates, either by disk or over a network. The doctors or associates then download the appropriate data to the devices 1 which are given to them for each of their users or patients. At the end of the campaign of trials, the results are downloaded, from the memory of the devices, to the computers 20, where they can form the subject of an initial report. They are then sent 19 to the local centers 17, then to the research center 16, where they are exploited and analysed.

This method differs from the traditional method only in terms of the use of the recording devices 1. The use of these devices, however, makes it possible to collect data of greatly improved reliability, and thus to avoid many checks and attempts at correcting errors or omissions. Coding of data on the basis of data recorded on paper is no longer necessary, which allows time to be saved and eliminates a source of errors. A mechanism for encryption of the data guarantees their confidentiality and gives only authorized persons access to the data. An identification number, specific to each of the devices 1, can be used to authenticate the source of the data.

All these characteristics confer on the results of the trials conducted using a device 1 and the method according to the invention an enhanced value compared to those obtained by a traditional method.

The device 1 and the method according to the invention are applied in particular to clinical trials of medicaments or analysis of human behavior. However, without departing from the scope of the invention, they can be applied to any other type of campaign of trials, including the recording of the occurrence of isolated events and the start and end of conditions, such as periods of work or performances.

What is claimed is:

1. Portable electronic recording device for recording events comprising:

means for giving commands to the said device;

means for emitting signals;

a memory for storing the commands given to the said device;

characterized in that the means for giving commands to the said portable electronic recording device comprise a first means for giving a start command by a user of the portable electronic recording device for recording the start of an event and a second means for giving an end command by a user of the portable electronic recording device for recording the end of an event, in that the portable electronic recording device comprises means for triggering the means for emitting a signal to emit a reminder signal as a reminder that an event is in progress, the said reminder signal being activated by a start command of said first means and deactivated by an end command of the said second means;

and in that the portable electronic recording device comprises means for storing the date and time of the start and end of the event in the memory in response to a start and an end command, respectively.

2. Portable electronic recording device according to claim 1, characterized in that it comprises a means for giving commands by a user of the portable electronic recording device for recording the occurrence of an isolated event and means for storing the date and time of this event in the memory.

3. Portable electronic recording device according to claim 2, characterized in that it comprises means for commanding by a user of the portable electronic recording device the selection of a type of event from a set of types of events, means for triggering the means for emitting a signal to emit a type selection reminder signal as a reminder that a selection of a type is to be made, the said type selection reminder signal being able to be activated by the second means for giving an end command for recording the end of an event or by the means for giving commands for recording the occurrence of an isolated event, and means for storing the selected type of event in the memory corresponding to the type selection made by the user of the portable electronic recording device.

4. Portable electronic recording device according to claim 2, characterized in that it comprises means for commanding the selection by a user of the portable electronic recording device of the value of a characteristic of an event from a set of values of characteristics, means for triggering the means for emitting a signal to emit a value selection reminder signal as a reminder that a selection of a value is to be made, the said value selection reminder signal being able to be activated by the second means for giving an end command for recording the end of an event or by the means for giving commands for recording the end of an event or by the means for giving commands for recording the occurrence of an isolated event, or by the means for commanding the selection of a type of event, and means for storing the value of the characteristic of the event corresponding to the value selection made by the user of the portable electronic recording device.

5. Portable electronic recording device according to claim 2, characterized in that it comprises means for downloading, into its memory, data originating from a computer and defining the campaign of trials to be conducted, and for downloading the results these trials, recorded in its memory, to the said computer.

6. Portable electronic recording device according to claim 1, characterized in that it comprises means for commanding by a user of the portable electronic recording device the selection of a type of event from a set of types of events, means for triggering the means for emitting a signal to emit a type selection reminder signal as a reminder that a selection of a type is to be made, the said type selection reminder signal being able to be activated by the second means for giving an end command for recording the end of an event or by the means for giving commands for recording the occurrence of an isolated event, and means for storing the selected type of event in the memory corresponding to the type selection made by the user of the portable electronic recording device.

7. Portable electronic recording device according to claim 1, characterized in that it comprises means for commanding the selection, by a user of the portable electronic recording device, of the value of a characteristic of an event from a set of values of characteristics, means for triggering the means for emitting a signal to emit a value selection reminder signal as a reminder that a selection of a value is to be made, the said value selection reminder signal being able to be activated by the second means for giving an end command for recording the end of an event or by the means for giving commands for recording the occurrence of an isolated event, or by the means for commanding the selection of a type of event, and means for storing the value of the characteristic of the event corresponding to the value selection made by the user of the portable electronic recording device.

8. Portable electronic recording device according to claim 7, characterized in that the means for commanding, by a user of the portable electronic recording device, the selection of a type of event or of the value of a characteristic of an event comprise a display screen (2).

9. Portable electronic recording device according to claim 7, characterized in that the means for commanding, by a user of the portable electronic recording device, the selection of a type of event or of the value of a characteristic of an event comprise voice synthesis means.

10. Portable electronic recording device according to claim 1, characterized in that it comprises means for reminding the user that an action is to be taken.

11. Portable electronic recording device according to claim 1, characterized in that it comprises means for downloading, into its memory, data originating from a computer and defining the campaign of trials to be conducted, and for downloading the results of these trials, recorded in its memory, to the said computer.

12. Portable electronic recording device according to claim 1, characterized in that the means for giving commands to the said device comprise push-buttons wherein pressing a push-button activates a command.

13. Portable electronic recording device according to claim 12, characterized in that the push-buttons comprise means ensuring that commands are given to the said device by a user of the portable electronic recording only following a number of presses on a push-button in quick succession.

14. Portable electronic recording device according to claim 1, characterized in that the means for giving commands to the said device comprise voice recognition means.

15. Portable electronic recording device according to claim 1, characterized in that the means for emitting signals comprise means for emitting tones.

16. Portable electronic recording device according to claim 1, characterized in that the means for emitting signals comprise means for emitting light signals.

17. Portable electronic recording device according to claim 1, characterized in that the means for emitting signals comprise voice synthesis means.

18. Method for collecting data in a campaign of clinical trials or analysis of human behavior, wherein first data define a set of types of events to be recorded, a set of possible values of one or more characteristics associated with each of these types of events, and a set of particular actions to be taken at specified moments, said first set of data having been set up by a critical research center or center for analysis of human behavior, characterized in that it comprises the following steps:
　transfer of these first data, through local centers, to the computers of doctors or of associates;
　downloading these first data to a portable electronic recording device for recording events comprising:
　command means for giving commands to the device;
　means for emitting signals;
　a memory for storing the commands given to the device;
　characterized in that the command means for giving commands to the said device comprise a first means for giving a command for recording the start of an event and a second means for giving a command for recording the end of an event,
　in that the device comprises means for triggering a signal as a reminder that an event is in progress, the said signal being activated by the said first means and deactivated by the said second means;
　and in that the device comprises means for storing the date and time of the start and end of the event in the memory;
　recording of second data consisting of the dates and times of the start and end or occurrence of the events observed, with their types and the value of their characteristics, as observed and recorded by the users of the portable electronic recording device via the command means of the portable electronic recording device;
　downloading the said recorded second data to the computer of the doctors or associates;
　transfer of these recorded second data, through local centers to the clinical research center or center for analysis of human behavior;
　exploitation of these second data by the clinical research center or the center for analysis of human behavior.

\* \* \* \* \*

UNITED STATES PATENT AND TRADEMARK OFFICE
CERTIFICATE OF CORRECTION

PATENT NO. : 6,891,779 B1  
DATED : May 10, 2005  
INVENTOR(S) : Bruno Pornel

It is certified that error appears in the above-identified patent and that said Letters Patent is hereby corrected as shown below:

Column 1,
Line 14, 16, 19 and 27, change "behaviour" to -- behavior --.

Column 3,
Line 27, change "behaviour" to -- behavior --.
Line 46, change "centre" to -- center --.

Column 4,
Lines 8 and 12, change "centre" to -- center --.

Signed and Sealed this

Twenty-fifth Day of October, 2005

JON W. DUDAS
*Director of the United States Patent and Trademark Office*